No. 830,177. PATENTED SEPT. 4, 1906.
J. W. ROGERS.
ANIMAL TRAP.
APPLICATION FILED MAY 1, 1905. RENEWED AUG. 1, 1906.
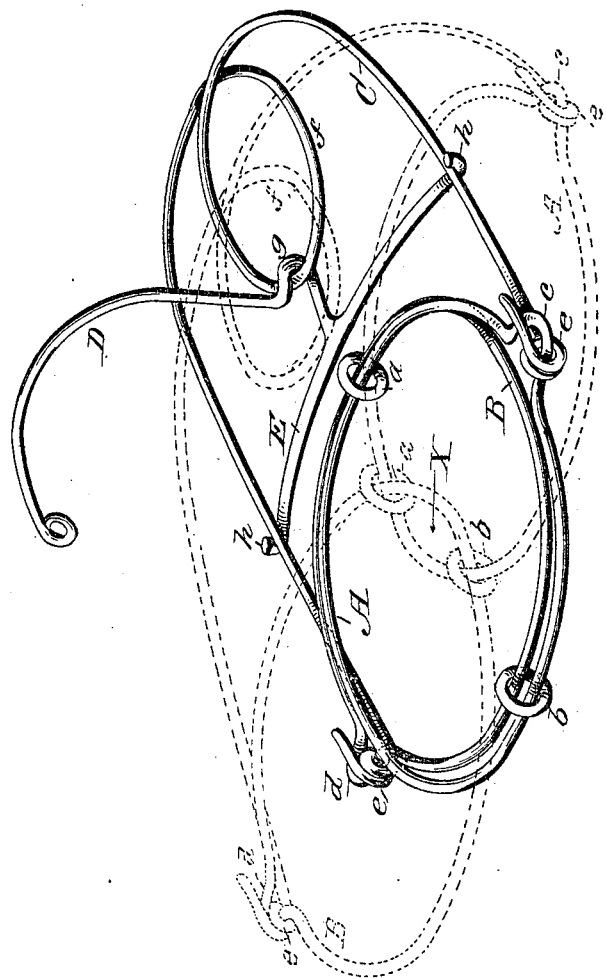
Witnesses
M. E. Moore
Wm. B. Goddard
Inventor
Joseph W. Rogers.
By Chas. N. Fowler
Attorney

UNITED STATES PATENT OFFICE.

JOSEPH W. ROGERS, OF BODINES, PENNSYLVANIA, ASSIGNOR OF ONE-HALF TO SOLON L. ANDREWS, OF BODINES, PENNSYLVANIA.

ANIMAL-TRAP.

No. 830,177.  Specification of Letters Patent.  Patented Sept. 4, 1906.

Application filed May 1, 1905. Renewed August 1, 1906. Serial No. 328,764.

*To all whom it may concern:*

Be it known that I, JOSEPH W. ROGERS, a citizen of the United States, residing at Bodines, in the county of Lycoming and State of Pennsylvania, have invented certain new and useful Improvements in Animal-Traps; and I do hereby declare that the following is a full, clear, and exact description of the same, reference being had to the annexed drawings, making a part of this specification, and to the letters of reference marked thereon.

The present invention has for its object to provide a trap equally adapted to small or large animals and capable of being hung up or placed flat upon the ground or other foundation over the burrow of the animal, the trap catching and choking the animal as it reaches for the bait, the purpose being to construct such a trap as will be simple, strong, and durable and easy of operation.

The invention consists in an animal-trap constructed substantially as shown in the drawing and hereinafter described and claimed.

The accompanying drawing shows a perspective view of a trap constructed in accordance with my invention, the trap being shown as set in full lines and as sprung in dotted lines.

The jaws of the trap comprise two rings A B of any suitable size and construction, which are held together or from being disengaged from each other by two clasps $a\ b$, through which the rings pass, the clasps in the present instance being in the form of two small rings. Each one of the rings A B has a loop $c\ d$, respectively, and located opposite each other, which engage eyes $e$ on the ends of a frame C, thereby forming a loose connection between the rings and the frame when the trap is sprung.

The frame C is substantially U shape and is constructed of a spring-metal wire of suitable thickness and bent to form a loop $f$, with which engages an elbow $g$ on the lower end of the bait-arm D, provided with suitable means for attaching a bait thereto. The lower end of the bait-arm D terminates in a yoke E, having catches $h$ at its ends which engage the sides of the U-shape frame C to hold the frame contracted when the trap is set.

The trap is shown as set in full lines of the drawing, and when thus set and placed over the burrow of the animal located therein the animal will extend its head through the rings A B to reach the bait on the end of the arm D, and by pulling down thereon the latch ends of the yoke E will be released from engagement with the sides of the frame C and spring outward, carrying with it the two ring-jaws A B.

The position of the trap when sprung is shown in dotted lines of the drawing, and the neck of the animal is caught between the ring-jaws at a point indicated at X, the two clasps preventing the jaws from being disconnected from each other.

The trap can be placed in any position that will require the animal to reach through the ring-jaws to obtain the bait, and the jaws may be of any preferred construction, similar to the jaws of the ordinary jaw-trap.

In describing the several details of construction such modification or changes therein as would be considered within the ordinary judgment of the mechanic may be resorted to without in any manner departing from the essential features of the invention.

Having now fully described my invention, what I claim as new, and desire to secure by Letters Patent, is—

1. An animal-trap comprising two ring-jaws, a spring-actuated frame loosely engaging the jaws, a bait-arm loosely engaging the frame, a yoke upon the lower end of the bait-arm adapted to engage the sides of the spring-actuated frame to hold it contracted, and means for holding the ring-jaws from being disconnected from each other, substantially as and for the purpose set forth.

2. An animal-trap comprising a spring-actuated frame having a loop, a bait-arm engaging the loop, a yoke upon the end of the arm with catches to engage the sides of the spring-actuated frame to hold it contracted, ring-jaws loosely engaging the ends of the frame, and clasps with which the jaws engage to prevent the jaws from being disconnected from each other, substantially as and for the purpose described.

In testimony whereof I affix my signature in presence of two witnesses.

JOSEPH W. ROGERS.

Witnesses:
 JOHN M. WILSON,
 JOHN C. ROGERS.